United States Patent
Van et al.

[11] 3,829,746
[45] Aug. 13, 1974

[54] LINEAR MOTOR WITH ELECTRO-MAGNETIC CONTROL

[76] Inventors: Trong Nguyen Van, 1 Allee du Dauphine 78170, La Celle St. Cloud; Louis Joseph Fechant, 19 Rue Albert ler 78, Le Vesinet, both of France

[22] Filed: Sept. 21, 1972

[21] Appl. No.: 290,860

[30] Foreign Application Priority Data
Sept. 28, 1971  France .............................. 71.34794

[52] U.S. Cl. ....................... 318/135, 310/12, 310/14
[51] Int. Cl. ............................................. H02k 41/02
[58] Field of Search .............................. 310/12–14; 318/135, 617

[56] References Cited
UNITED STATES PATENTS
3,219,853  11/1965  Schreiber ............................ 310/14
3,268,747  8/1966  Snowdon .............................. 310/13
3,441,819  4/1969  Palmero ......................... 310/12 UX OTHER PUBLICATIONS
Thompson, "Linear Incremental Motor," IBM Tech. Disclosure Bulletin, Vol. 6, No. 9, Feb. 1969, pp. 19–20.

Primary Examiner—D. F. Duggan
Attorney, Agent, or Firm—William Anthony Drucker

[57] ABSTRACT

Linear motor with electromagnetic control, characterized by the fact that it has a first rectilinear magnetic element having throughout the whole of its length uniformly distributed teeth opposite which there is a limited number of teeth belonging to other magnetic elements subjected to the action of a field created by a winding.

For use as a linear drive for textile machines, handling equipment and others.

3 Claims, 12 Drawing Figures

LINEAR MOTOR WITH ELECTRO-MAGNETIC CONTROL

The invention refers to a linear motor with electromagnetic control of the type in which the sliding element is subjected to the influence of a movable magnetic field; the said motor could find its main application in textile machines, handling equipment, conveying equipment and even in machine tools where it is desired to control the movement of a table or of a tool, and in general for all purposes where it is necessary to use linear drive.

Linear electromagnetic motors are already known in which one of the elements is designed in the form of the stator of an asynchronous motor while the other element is a massive unit the construction of which resembles that of the rotor of the said motor.

These motors possess a certain number of disadvantages in those applications where it is also desired to achieve accurate rather than rapid movement. In addition, by the very nature of their design, these latter only lend themselves to electronic speed control at the cost of expensive equipment if a wide range of frequencies is to be covered.

Finally, these motors do not generally have the benefit of a blocking force when stopped or tend to overheat excessively, and it is not possible to fix with precision the exact position of the sliding element in terms of time, because of the slip which depends on the load and the speed.

The invention is intended to lead to an electromagnetic linear motor which will make it possible to obtain either an immediate variable speed ranging from step by step up to a higher speed, followed by effective braking and economic blocking when stopped, and finally a method of control well adapted to the reduction of the impulse in order that, at any given moment, the position of the sliding element may be known with the help of electronic systems which, to-day, have the advantage of being compatible with the modern control systems with which it can be associated, or, alternatively, a constant displacement speed obtained by means of a simple feed, not requiring any active electronic components and connected directly to the alternative industrial sector. According to the invention, this result is achieved thanks to the fact that the motor has a first rectilinear magnetic element with teeth uniformly spaced throughout its entire length, opposite which there is a limited number of teeth, also equally spaced and belonging to at least three secondary magnetic elements subjected alternately to the influence of a magnetic field generated by a winding in such a way that the variable reluctance existing between the opposing teeth tends to drop when current passes through one of the windings, and means of guidance whereby relative movement is possible between the first element and the secondary elements under the influence of the magnetic field passing through them. In accordance with one interesting form of the invention, the secondary magnetic elements are fixed and each of them consists of a magnetic circuit which is interleaved in the direction of relative displacement and takes the form of a U, each branch of which, surrounded by a winding, terminates in a reduced number of teeth, the pitch of which corresponds to that of the teeth of the first element.

According to one especially advantageous version, the first element consists of a strip of magnetic metal having rectangular perforations arranged throughout its whole length, perpendicularly to the direction of relative movement, the said strip being pressed against a magnetic mass of sufficient thickness to close the flux and to transmit the movement to an exterior instrument. Other features, advantages and constructional versions will appear more clearly with the help of the description which follows.

Figure 1:
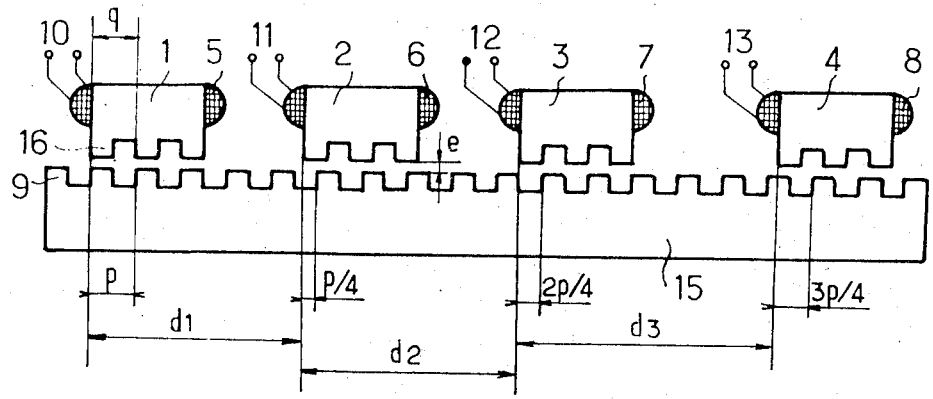
FIG. 1 is an elevation of a device according to the invention.
Figure 11:
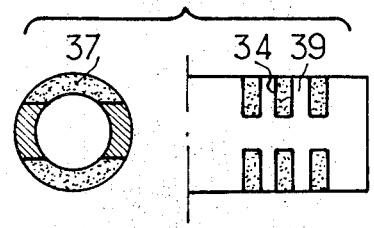
Figure 12:
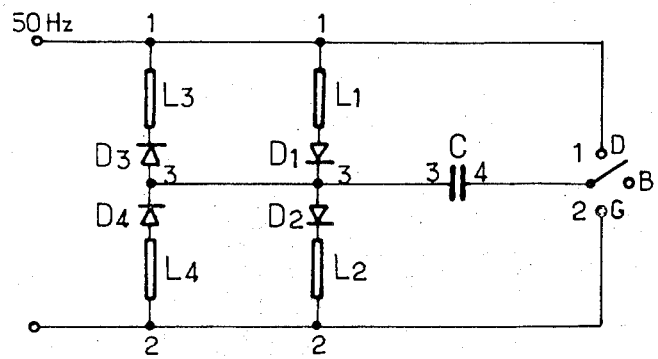

FIG. 11 is another version of the sliding element used in the two preceding figures, and FIG. 12 is a diagram of the power supply to the motor which can be connected directly to the alternative single-phase supply. Turning to FIG. 1, it will be seen that 15 is a first element and 1, 2, 3 and 4 are the second elements, which are the main components of the linear motor; for greater clarity, the means of guidance permitting relative movement between the first and secondary elements are not shown. It is assumed that these means of guidance permit rectilinear displacement of the first element 15 and ensure the stability of the secondary elements 1, 2, 3 and 4.

In the remainder of the text, the first element 15 will henceforth be termed the sliding element, while the secondary fixed elements will be designated by pole pieces.

The sliding element 15 consists of a bar of magnetic metal which, in the present case, is of rectangular section; parallel grooves have been made in one of the faces to allow for teeth such as 9. The teeth are separated from one another by a distance equal to the value $p$ which is termed the pitch of the teeth. Opposite the face with the teeth are four pole pieces 1, 2, 3 and 4 each provided with teeth such as 16, comparable in shape to the previous ones. It is not essential that the distance $q$ between two of these teeth be exactly the same as the distance $p$, but in what follows it will be assumed that $p$ is equal to $q$. The planes passing through the external faces of the teeth 9 and 16 are parallel and separated by an interval $e$ which forms an air-gap.

When one of the lateral faces of a tooth 16 belonging to the stud 1 is lined up with a lateral face, similarly disposed, of a tooth 9 of the sliding element, the corresponding faces of studs 2, 3 and 4 are displaced by a quarter of the tooth pitch and half the tooth pitch respectively.

The distances $d1$, $d2$ and $d3$ separating the studs are not critical provided that they conform to values equal to $Kp \mp \frac{1}{4}p$ and prevent magnetic short circuits between two adjoining pole pieces; if $p$ is different from $q$, the distances just mentioned should be counted, not from the first lateral face of each pole piece, but from its plane of symmetry.

Each pole piece consists of stacked magnetic sheets, the layering plane of which is parallel to that of the plane of the drawing, the magnetic circuit thus formed being surrounded by windings 5, 6, 7 and 8.

The length of the pole pieces is selected so that the number of teeth 16 is small, and of the order of 1 to 4.

In the position shown in FIG. 1, it will be seen that, when a supply of current is fed to the terminals 10, the winding 1 does not tend to bring about a displacement of the sliding element 15, seeing that the reluctance of the magnetic circuit created at this level is at its minimum. If, on the other hand, current is fed simultaneously to the terminals 10 and 11, the sliding element begins to move to the left in order that the two reluctances present at the level of each pole piece may be as weak as possible. The act of cutting off the current to 10 results in a further movement of the sliding element to the left, which puts the teeth 9 and the teeth 16 of the pole piece 2 in a relative position analogous to that shown in FIG. 1 for the pole piece 1.

It will be understood that the supply of current to terminals 11 and 12, and then to 12, 13 will produce a further movement of the sliding element until the moment is reached where the position shown in FIG. 1 is reproduced at about one tooth pitch. With the different displacements $d1$ and $d2$, it could suffice to have three pole pieces, themselves also fed with current cyclically, to produce the movement. It would also be possible to have more than four pole pieces. Generally speaking, the distances separating the pole pieces are in the form of $d = Kp \pm P/n$, $n$ being the number of pole pieces.

In practice, the arrangement shown in FIG. 1 is not sufficiently satisfactory, in that the closing of the flux takes place in the air.

Figure 2:
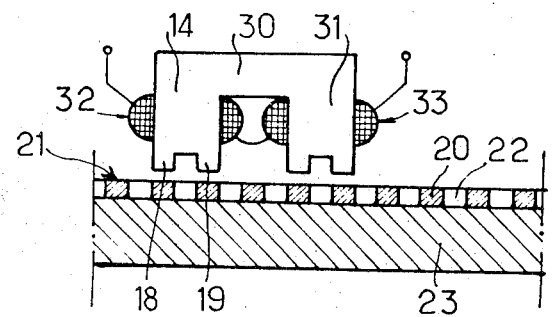
FIGS. 2 and 3 are an elevation, with part section, and a view from above of an improved version.
Figure 3:
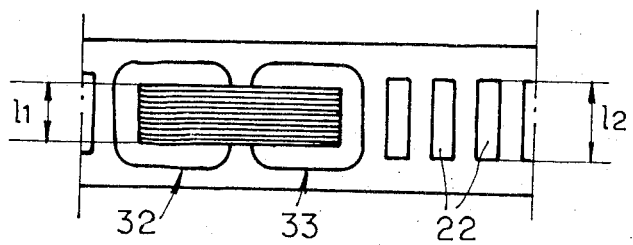

The version shown in FIGS. 2 and 3 permits effective closing of the flux and leads to a saving of copper. Here, the magnetic core 30 of the pole piece takes the form of a U, on the arms 14, 31 of which two smaller windings 16, 17 respectively are fitted, these being mounted, possibly, in series in terms of a given direction of the winding. Each of these arms terminates in two teeth such as 18, 19 which mesh with teeth 20 obtained by perforating rectangular openings 22 in a strip of magnetic material 21 which is subsequently fixed, by any method ensuring good adhesion of its surface, to a solid magnetic bar 23; these openings are located perpendicular to the direction of relative displacement, as may be seen from FIG. 3. The bar 23 should be of a thickness sufficient to allow the lines of force to pass through it without difficulty, and to ensure that its rigidity allows it to transmit stresses during movement. In view of the intermittent nature of the current impulses, care should also be taken to ensure that the mechanical resonance frequency of the bar does not coincide with that of excitation. None the less, if the air-gap is appropriately dimensioned, and if the distance separating the pole pieces is suitably fixed, it is possible to obtain advantageous results for certain vibration modes and for a given distribution of the supply to the pole pieces.

Figure 4:
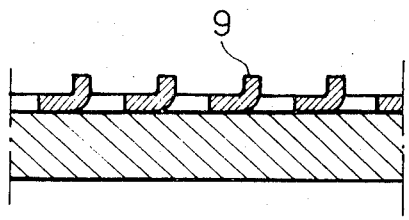
FIGS. 4, 5, 6 and 7 show different versions of the sliding element.
Figure 5:
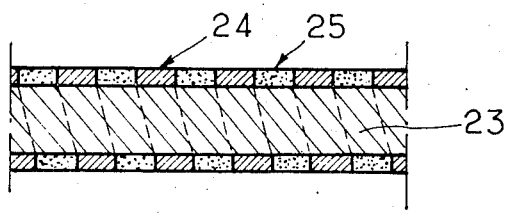
Figure 6:
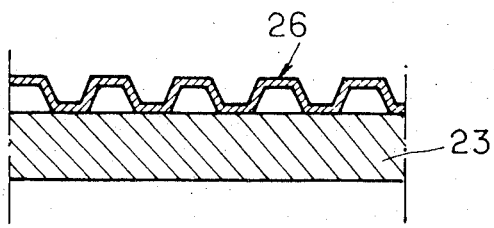

It is also possible to arrange the pole pieces on both sides of the sliding element, or indeed opposite the four faces, if the latter have been equipped with teeth or with a similar structure. FIGS. 4, 5 and 6 depict economic versions which can be adopted for the teeth of the sliding element.

In FIG. 4, the teeth 9 are produced by folding back a lip formed by an opening cut on three sides.

In FIG. 5, the teeth of the sliding element are obtained by winding on to a bar 23 a magnetic wire 24 together with a nonmagnetic wire 25 which can, for example, be an insulator. In FIG. 6, a strip of currugated magnetic sheet 26 has been affixed by soldering or gluing to a bar 23.

Figure 7:
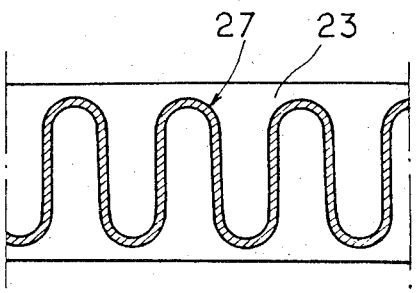

FIG. 7 shows a view from above of the sliding element, indicating how a magnetic wire 27 can be arranged on the bar 23 to have projections which act as magnetic teeth.

All these variations can, in addition, be supplemented by a deposit of plastic material in the cavities separating the teeth. It is thus possible to obtain a uniform surface allowing the sliding element to cooperate effectively with the devices ensuring thightness of the casing of the motor.

Figure 8:
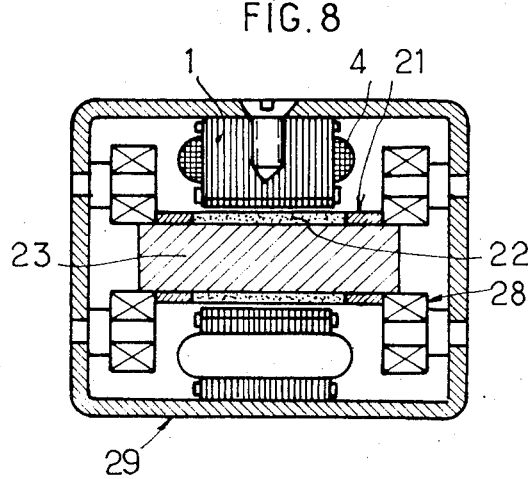
FIG. 8 is a transverse sectional view of a motive unit based on the motor in accordance with the invention.

One version of the linear motor in accordance with the invention is also shown in FIG. 8, in which components having the same functions are identified by the same key numbers as previously. The guidance system for the sliding element is shown here, consisting of four ball bearings such as 28, the circumference of which bears on the opposing faces of the bar 23. The teeth 9 are formed by means of two metal strips of the type shown in FIGS. 2 and 3, and their edges serve the purpose of lateral guidance of the sliding element by bearing on the lateral faces of the outer races of the bearings 28.

The dimensions of the various components which are given below are to be taken as a non-restrictive example. It is certain that the resultant proportions will in general be fairly close to those of motors of larger size, but the forces in play will in this case also be greater.

Good results have been obtained with a tooth pitch of 1.6 mm and a width $l2$ of tooth of 20 mm for the sliding element. On this basis, the air-gap $e$ selected was 0.1 mm. To avoid edge effects and to increase the ratio between the lateral force and the normal force, it was found advantageous to reduce slightly the thickness of the teeth of the pole pieces to bring it to $p/2 - 2e$. The width of the teeth of the pole pieces was itself reduced to a value $l1$ less than or equal to $l2 - 2e$, see FIG. 3. Repeated tests showed that the lateral force transmitted to the sliding element was of the order of 8 kg for a current strength of 5 amperes with a width $l1$ of around 10 mm.

On stopping, the blocking force is around 20 kg, and if a greater resistant force is applied for a short instant, the sliding element stops or moves back to take up an immediately adjoining position.

It is possible to increase these forces by raising the number of ampere turns of the windings and/or by increasing the width of the teeth. In practice, it is better to instal the pole pieces in parallel in order to obviate the effects of self-induction. An increase in the tooth pitch is also feasible, but at the cost of the smallest possible advance in step by step running. This characteristic is of particular interest in connection with those applications where the motors are required to stand up to loads greater than their nominal rating without suffering the effects of slip. The behaviour is similar to that of a rotary motor fitted with a torque restricting clutch, but without loss of energy through friction.

Figure 9:
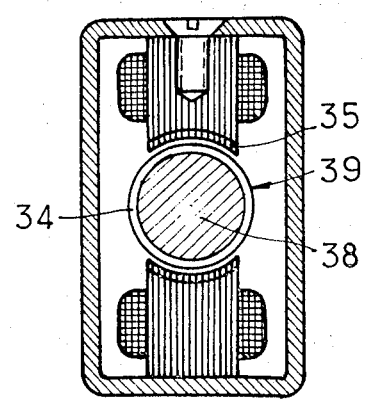
FIGS. 9 and 10 are sectional views of a motive unit.
Figure 10:
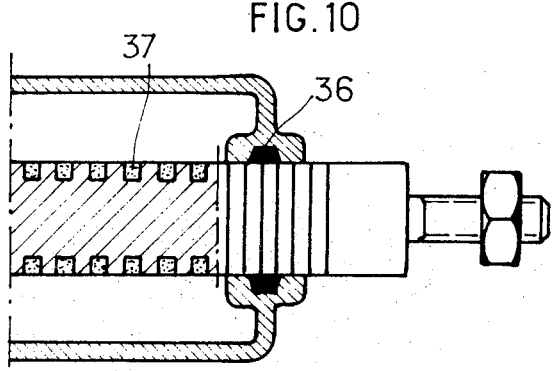

In some applications, there is a requirement for a linear motor, the sliding element of which is circular. Such a version is shown in FIGS. 9 and 10, from which it will be seen that, in this case, the teeth have been formed by the cutting of circular grooves 34 in a cylindrical shaft 38, while the surface of the teeth 35 of the pole pieces has been modified to follow a corresponding contour. If the circular grooves are filled with a suitable plastic material 37, as in FIG. 10, the problem of ensuring tightness of the shaft at its point of emergence is solved in a neat manner with the aid of well-known devices designated by 36. Another version is shown in FIG. 11, in which the teeth 39 are obtained by cutting openings 34 which are subsequently filled with a plastic material 37.

Naturally, modifications can be made to certain procedures or methods of accomplishment, and in this way it is, for example, possible to obtain sets of teeth by electro-erosion or by layering cut sheet to produce the sliding element. If this latter is suitably coated with a plastic substance possessing good resistance to friction, it can be guided directly by the surface of the pole pieces, which are themselves suitably coated.

The sets of teeth can also be oblique relative to the direction of relative displacement. Finally, it is also possible to connect up motors of different tooth pitches in order to obtain either a differential effect or a mobile device reacting to coarse-fine control.

As has been explained above, the windings of the various pole pieces should be excited in turn, according to the relative position of the teeth of the latter and of those of the sliding element.

The order of excitation of the pole pieces shown in FIG. 1 is from right to left. If we designate the windings corresponding to the pole pieces 1, 2, 3 and 4 by L1, L2, L3 and L4, it is sufficient if only L1 and L2 are traversed by a current flowing in the same direction but out of phase to a certain extent for one current polarity, and that L1 and L2 are subsequently traversed by a current in an analogous manner, but making use of a change of polarity in order to be able to utilise directly the alternative single phase sector.

An example of such a version is shown in the diagram in FIG. 12.

Two leads, of which the potential is indicated by 1 and 2, are connected to the terminals of the 50 Hz supply. The following two sets of components are connected in parallel between these two leads:
1. the winding L3, the diode D3, the diode D4, the winding L4;
2. the winding L1, the diode D1, the diode D2, the winding L2.

The diodes D3 and D4 are arranged in such a way that a current can pass through them from the potential 2 towards the potential 1, while the diodes D1 and D2 are fitted in the reverse manner. The points common to the two diodes in each branch are linked by a conductor of potential 3 terminating at one of the plates of a dephasing condenser C.

The second plate of the condenser is connected to the brush of potential 4 of a three-pole commutator, the end terminals of which are brought respectively to the potentials 1 and 2. The intermediate terminal is not connected to a specific potential and corresponds to a position of the reverser which does not involve the condenser C.

Assuming the brush of the reverser to be connected to the potential 2, it will be seen that when the potential 1 is positive in terms of 2, a current will flow first in L1, D1 across C and then across C, D2 and L2.

When the following alternation causes the lead 2 to be positive in terms of lead 1, the windings L3 and L4 will be excited in a similar way. In this case, the sliding element will move to the left.

If the brush of the reverser is connected to the terminal of potential 1, and if the potential is positive, current will flow in turn through the windings, but in a different order, viz., L2, L1, L4 and L3. The result will be a shift of the sliding element to the right.

The intermediate position of the brush of the reverser will give rise to the simultaneous flow of current first in L1 and L2 and then in L4 and L3. The various air-gaps will thus not be acted upon in sequence, and the sliding element will retain a stable position from which it will not move unless a very large axial force is exerted on it. This position is thus that of blockage of the sliding element.

It is naturally possible to design more elaborate excitation circuits by making use of controlled semiconductor elements and by supplying the coils with direct current, but these systems are only justified by their flexibility in operation, their high output and the fact that they are generally associated with a variable speed control.

We claim:

1. Linear motor comprising a first rectilinear magnetic element having throughout the whole of its length equally spaced teeth; at least three second rectilinear magnetic elements each having a limited number of equally spaced teeth forming an air gap with the teeth of the first element, a winding on each of the second magnetic elements; guiding means permitting relative movement between the first element and the second element parallel to the plane of the air-gap; and means for cyclically energizing the respective windings according to a predetermined order of succession, the first element essentially consisting of a strip of magnetic metal having rectangular openings each limited on one side by an upturned lip which forms a tooth of the first element, said rectangular openings being formed throughout the whole length of the strip perpendicular to the direction of relative movement, the strip bearing against a solid magnetic support.

2. Linear motor comprising a first rectilinear magnetic element having throughout the whole of its length equally spaced teeth; at least three second rectilinear magnetic elements each having a limited number of equally spaced teeth forming an air gap with the teeth of the first element, a winding on each of the second magnetic elements; guiding means permitting relative movement between the first element and the second element parallel to the plane of the air-gap; and means for cyclically energizing the respective windings according to a predetermined order of succession, the first element essentially consisting of a strip of magnetic metal having corrugations the lower peaks of which are secured to a solid magnetic support, said corrugations being formed throughout the whole length of the strip perpendicular to the direction of relative movement.

3. Linear motor comprising a first rectilinear magnetic element having throughout the whole of its length equally spaced teeth; at least three second rectilinear magnetic elements each having a limited number of equally spaced teeth forming an air gap with the teeth of the first element, a winding on each of the second magnetic elements; guiding means permitting relative movement between the first element and the second element parallel to the plane of the air-gap; and means for cyclically energizing the respective windings according to a predetermined order of succession, the first element essentially consisting of a strip of magnetic metal shaped as a plane sinuous band the whole surface of which bears against a solid magnetic support.

* * * * *

UNITED STATES PATENT AND TRADEMARK OFFICE
CERTIFICATE OF CORRECTION

PATENT NO. : 3,829,746
DATED : August 13, 1974
INVENTOR(S) : Trong Nguyen Van et al.

It is certified that error appears in the above-identified patent and that said Letters Patent are hereby corrected as shown below:

Assignment recorded on June 4, 1974 from the inventors to

La Telemacanique Electrique.

Signed and Sealed this

Twenty-eighth Day of September 1976

[SEAL]

Attest:

RUTH C. MASON
*Attesting Officer*

C. MARSHALL DANN
*Commissioner of Patents and Trademarks*